No. 836,267. PATENTED NOV. 20, 1906.
E. METTLER.
BOILER TUBE CLEANER.
APPLICATION FILED MAR. 14, 1904.
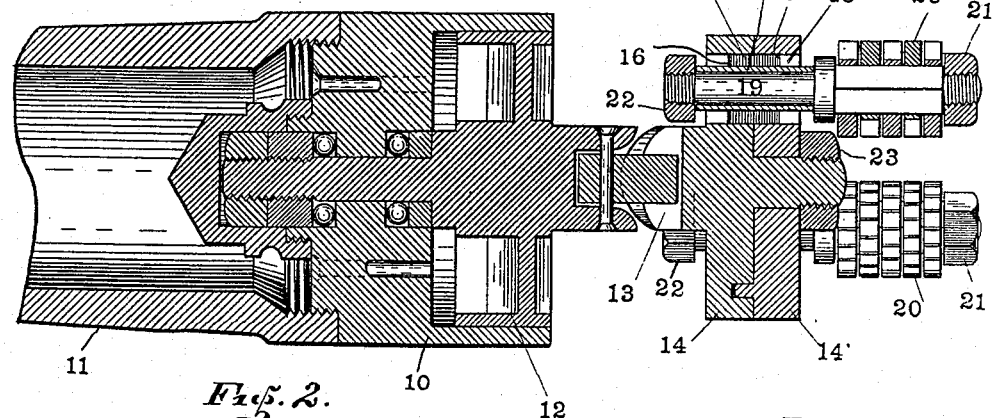
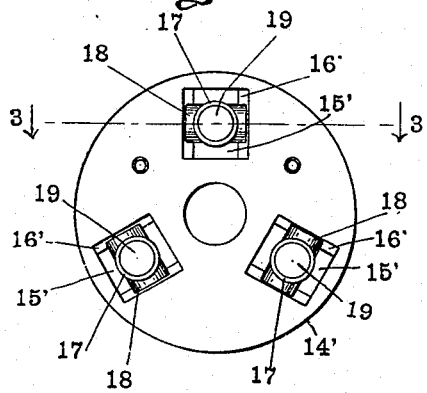
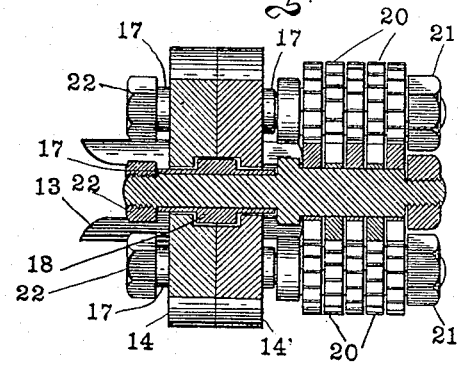
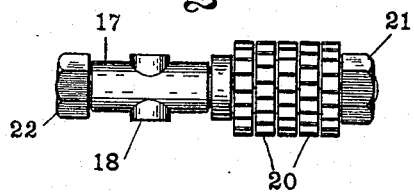
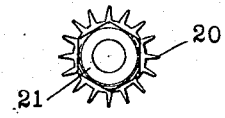
Witnesses
Adelaide Kearns
J. A. Walsh
Inventor
Eugene Mettler
By Bradford V. Hood,
Attorneys

UNITED STATES PATENT OFFICE.

EUGENE METTLER, OF INDIANAPOLIS, INDIANA, ASSIGNOR TO LAGONDA MANUFACTURING COMPANY, OF SPRINGFIELD, OHIO, A CORPORATION OF OHIO.

BOILER-TUBE CLEANER.

No. 836,267.

Specification of Letters Patent.

Patented Nov. 20, 1906.

Application filed March 14, 1904. Serial No. 198,011.

*To all whom it may concern:*

Be it known that I, EUGENE METTLER, a citizen of the United States, residing at Indianapolis, in the county of Marion and State of Indiana, have invented certain new and useful Improvements in Boiler-Tube Cleaners, of which the following is a specification.

The object of my invention is to produce a cleaning-tool for the water-tubes of water-tube boilers, the construction being such that the entire length of each cutting-arm may lie so as to bring each cutter-wheel into action independent of the thickness of the scale.

A further object of my invention is to provide means by which the several cutter-wheels on each shaft may be arranged in fixed relations, whereby a more efficient action on the scale may be had.

The accompanying drawings illustrate my invention.

Figure 1 is an axial section; Fig. 2, a transverse detail; Fig. 3, a section on line 3 3 of Fig. 2; Fig. 4, a detail of one of the cutter-shafts; Fig. 5, an end elevation of one of the cutter-shafts.

In the drawings, 10 indicates a suitable motor-casing adapted to be secured to the discharge end of a suitable supply-hose 11. Arranged in casing 10 is a usual turbine 12, to which the shaft 13 of my improved cutter-head is attached through a universal joint, if desired. Secured to shaft 13 is a head 14, provided on its outer face with a series of radial slots 15, each of which is provided with a pair of opposed shelves or shoulders 16. Mating with head 14 and pinned thereto is a similar head 14', provided with similar slots 15', having shoulders 16'. Mounted in and projecting through each pair of slots 15 15' is a tubular bearing 17, provided with a cross-journal 18, which rests upon and journals between the shelves 16 16'. Journaled in each bearing 17 is a shaft 19. Said shaft is polygonal at its outer end and is adapted to receive a plurality of cutters 20, which are held thereon by a suitable nut 21.

The polygonal axial opening in each cutter is so arranged that the teeth of adjacent cutters will be staggered and at all times remain in this fixed relation.

Each shaft 19 is removably held in its tubular bearing 17 by any suitable means, such as a nut 22, and the head 14' is removably held in place by a nut 23 on shaft 13.

In operation the rotation of the turbine rotates the heads 14 14', and the cutters 20 are thrown out against the wall of a tube. The tubular bearings 17 are free to move bodily radially and also to swing on the trunnions 18, and the shafts 19 are also free to rotate. As a consequence, all the cutters of each shaft will be brought into action irrespective of the thickness of the scale.

The cutters may be rotatable on the shafts 19; but I prefer to fix them on the shaft, as described, with the teeth of adjacent cutters staggered, for the reason that a better chipping action on the scale is had, the scale being broken into finer pieces.

It will be noticed that the several parts may be taken apart, new pieces substituted, and the tool reassembled with great ease.

I am aware that in the patent to Henry F. Weinland, No. 789,192, dated May 9, 1905, for improvements in boiler-tube cleaners, and issued to the Lagonda Manufacturing Company, my assignee of this present invention, there is shown an arm capable of radial movement and mounted on trunnions; but in such case the arm extends to both sides of the head—that is, to the rear and to the front—and both ends of the arm carry cutters. I wish to be understood as disclaiming a construction wherein the work of the cutters on one end of the arm is controlled or modified by the presence of the cutters on the other end of the arm. In my organization the working portion of the arm is not distributed partly on the forward and partly on the rear side of the head, but is located and operates wholly on one side of the head, and the work of the cutters so placed is not modified or controlled by the presence of cutters elsewhere or to the rear head on the arm, as in said patent.

I claim as my invention—

1. In a tube-cleaner, a rotatable head having radial slots, each slot having opposed guiding-surfaces, an arm arranged in each slot with trunnions bearing on said guiding-surfaces, upon which trunnions said arm is pivoted, and cutters carried by each arm, said head being divided into two separable parts in a plane transverse to its axis of rotation and lying between the guiding-surfaces, substantially as described.

2. In a tube-cleaner, the combination, with suitable rotating means, of a shaft carrying a head having radial slots each with a pair of opposed radial shelves therein, a tubular bearing arranged in each slot with trunnions bearing on said shelves and upon which said bearing is pivoted, a shaft journaled in each tubular bearing, and cutters carried by said shaft.

3. In a tube-cleaner, the combination of a shaft-carrying head having radial slots each with a pair of opposed radial shelves therein, a tubular bearing arranged in each slot with trunnions bearing on said shelves and upon which said bearing is pivoted, a shaft journaled in each tubular bearing, and cutters carried by said shaft.

4. In a tube-cleaner, the combination, with suitable rotating means, of a shaft carrying a head having radial slots each with a pair of opposed radial shelves therein, a tubular bearing arranged in each slot with trunnions bearing on said shelves and upon which said bearing is pivoted, a shaft journaled in each tubular bearing, and a plurality of disk cutters fixed on said shaft with the teeth thereof staggered, for the purpose set forth.

In witness whereof I have hereunto set my hand and seal, at Indianapolis, Indiana, this 8th day of March, A. D. 1904.

EUGENE METTLER. [L. S.]

Witnesses:
ARTHUR M. HOOD,
JAMES A. WALSH.